May 22, 1934. J. R. CROSSAN 1,959,460
METHOD OF PRODUCING PUNCTUREPROOF TIRE TUBES
Original Filed July 11, 1930   3 Sheets-Sheet 3
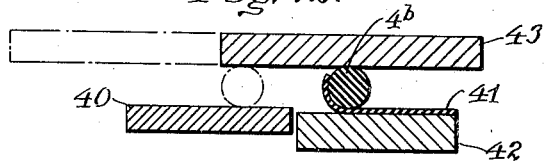
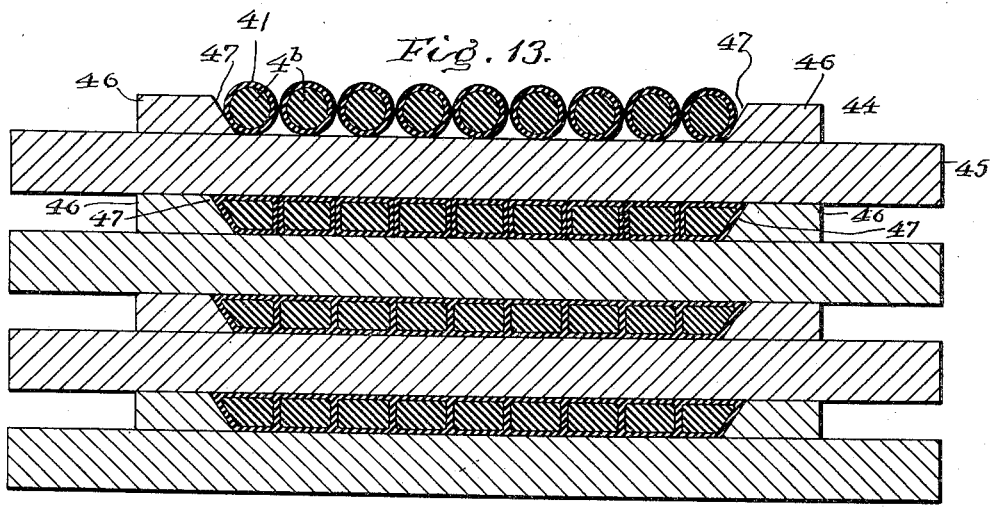
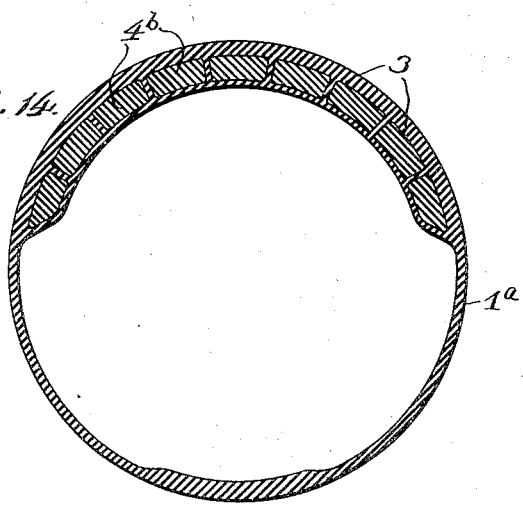

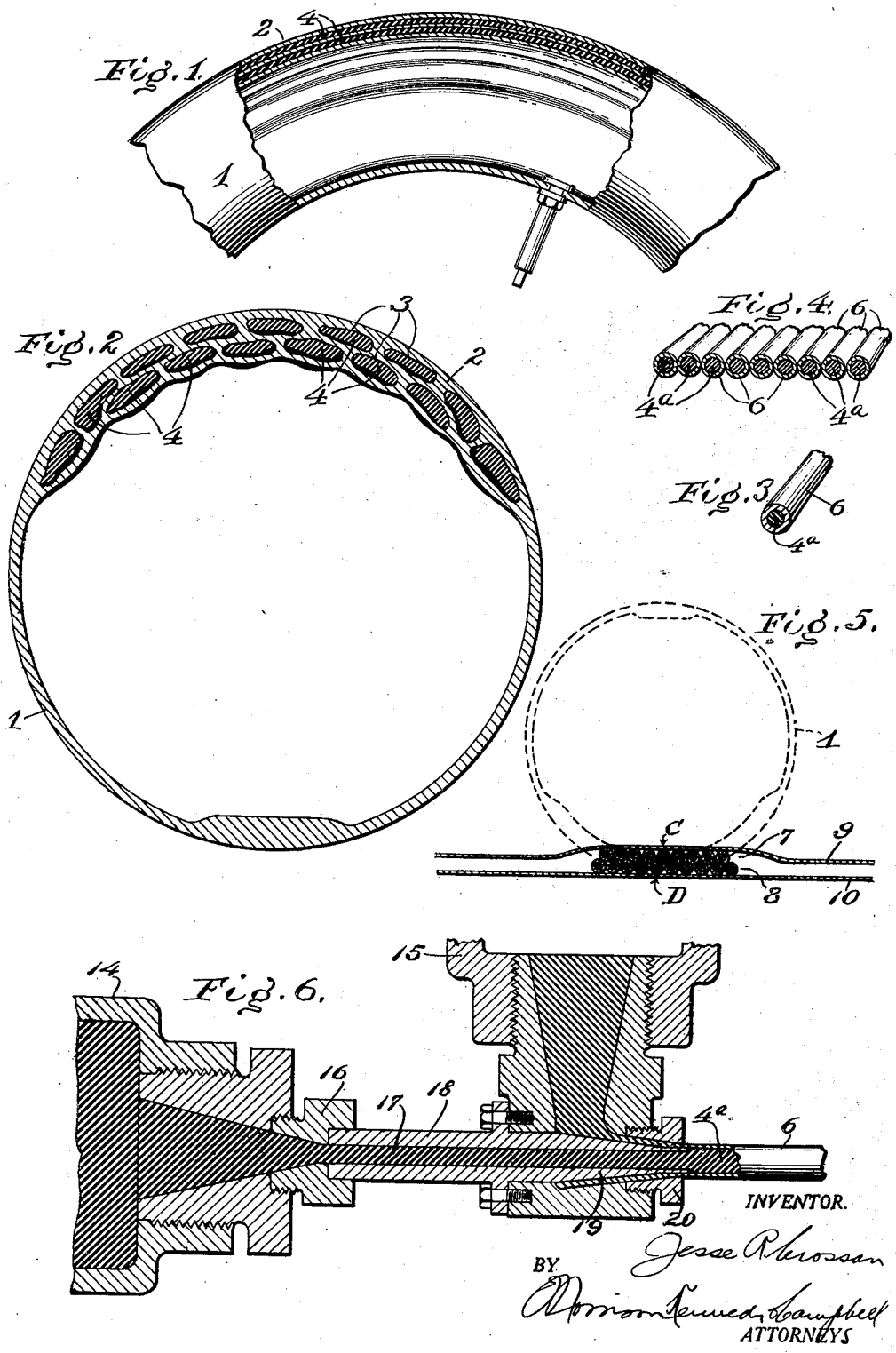

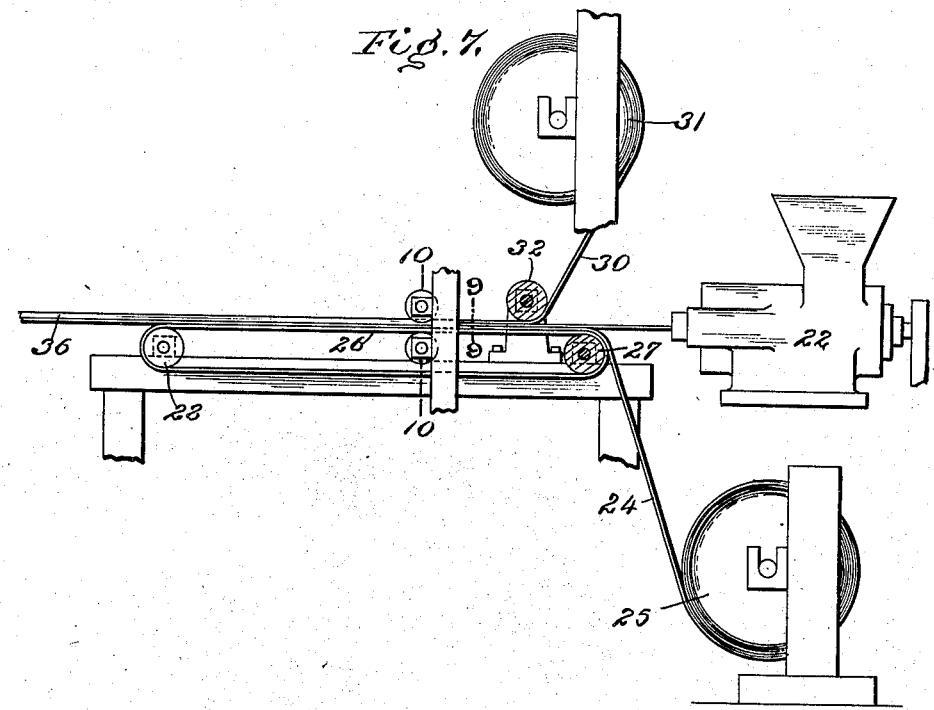
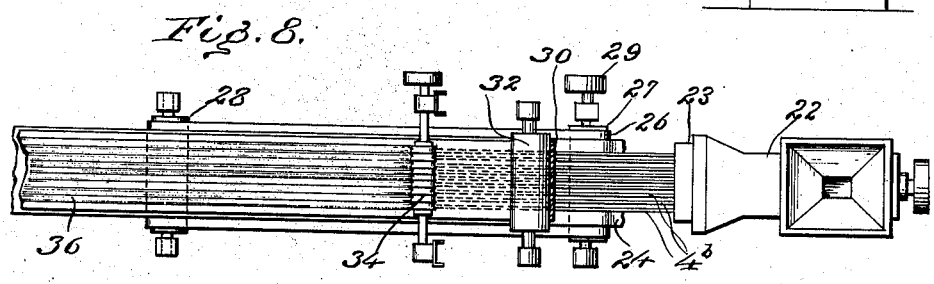
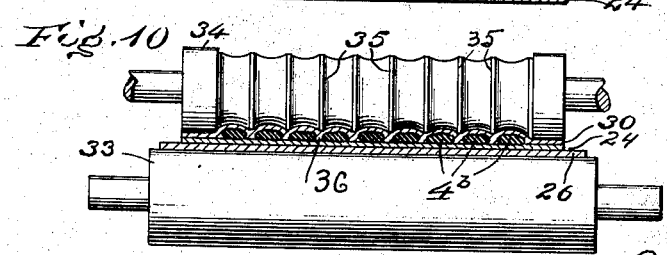

Patented May 22, 1934

1,959,460

UNITED STATES PATENT OFFICE 1,959,460

METHOD OF PRODUCING PUNCTUREPROOF TIRE TUBES

Jesse R. Crossan, Wadsworth, Ohio

Original application July 11, 1930, Serial No. 467,239. Divided and this application December 8, 1931, Serial No. 579,817

13 Claims. (Cl. 154—15)

This invention relates to the art of manufacturing inner tubes for pneumatic tires, and has reference particularly to punctureproof inner tubes, such as are described in my copending application Serial No. 467,239, filed July 11, 1930, and of which the present application is a division.

Several types of puncture-proof tubes have been proposed, one type employing a plastic sealing composition which is adapted automatically to flow into and seal punctures as they are formed. One suggested tube of this type has the inner surface of its tread portion lined with a layer of the plastic material, but difficulties have been experienced with it for several reasons. For instance, the sealing composition must be of such a nature as to function properly at widely variant temperatures, i. e. it must be soft or plastic enough to flow in cold weather, yet not too soft or plastic in hot weather. This requirement has greatly complicated the problem of compounding the stock. If the material becomes extremely soft in hot weather, as it usually does, it will be thrown by centrifugal force to the top or outermost circumference of the tube, resulting in an unequal distribution of the sealing composition.

To overcome these and other objections, it is proposed according to the present invention to confine the sealing composition locally in cells distributed over the tread area, instead of disposing it in a single continuous layer or mass, as heretofore. As a result, the sealing composition may be made as fluid or plastic as may be desired for all conditions and then embedded in the tread wall in such way as always to flow into and seal punctures which might develop in any part of the tread. In one embodiment illustrated, the tread wall is formed with a single row of adjoining circumferentially extending cells filled with the sealing composition, and in another embodiment with two rows of such cells, those of one row being staggered laterally with reference to those of the other.

The invention is directed to a novel method whereby the improved tube can be manufactured with facility and economy. This will best be understood from the detailed description to follow.

The foregoing and other objects, features, and advantages of the invention will be clear from the following description in connection with the accompanying drawings, wherein several embodiments are shown by way of illustration, and wherein Fig. 1 is a fragmentary side view, partly broken away and in section of an inner tube embodying the invention;

Fig. 2 is a vertical transverse sectional view of the tube shown in Fig. 1, and drawn to a larger scale;

Fig. 3 is a detail sectional perspective view of a single strip or rod of sealing composition covered with vulcanizable rubber;

Fig. 4 is a similar view of a plurality of such sealing strips or rods arranged together preparatory to their application to an inner tube;

Fig. 5 is a transverse sectional view illustrating one form of applying the sealing strips to the tube wall;

Fig. 6 is a fragmentary longitudinal sectional view through the extruding dies which are used for producing the composite units of Fig. 3;

Fig. 7 is a diagrammatic side elevation of an alternative apparatus which may be used for carrying out the method;

Fig. 8 is a top plan view thereof;

Fig. 9 is a vertical transverse sectional view on line 9—9 of Fig. 7;

Fig. 10 is a vertical transverse sectional view on line 10—10 of Fig. 7;

Fig. 11 is a transverse sectional view through a sealing strip having two rows of cells filled with the sealing composition;

Fig. 12 is a diagrammatic sectional view through an apparatus for practicing a modified step in the method of producing the noodles of plastic sealing composition;

Fig. 13 is a vertical transverse sectional view showing how the rubber covered noodles may be assembled together into a sealing strip ready for application to the wall of a tube; and Fig. 14 is a transverse sectional view through an inner tube equipped with only one row of sealing cells.

Referring first to Figs. 1 and 2, it will be seen that the improved tube comprises an endless annular body 1 of vulcanized rubber having a thickened tread wall 2 formed with a plurality of circumferentially extending cells 3 filled with a soft or plastic sealing composition 4. This sealing composition is also preferably composed of rubber, but it is compounded to resist vulcanization and thus to remain in its plastic state after the body portion 1 has been fully vulcanized, as well as to retain its plasticity under all conditions of use. In this illustrated embodiment, the filled cells 3 are arranged in two rows or layers, those of one layer being staggered with reference to those of the other layer, and thus any puncturing object entering the tread wall 2 of the tube will necessarily intersect or pierce at least one of the cells. As the puncturing object is withdrawn from the tube, the sealing composition from the punctured cell will flow or be drawn into the hole formed in the vulcanized rubber, and, by virtue of its plasticity, will seal the puncture and prevent the escape of air from within the tube.

While not absolutely essential, the cells 3 are each preferably made continuous or endless and extend entirely around the periphery of the inner tube.

One method for applying the sealing composition to the tread wall 2 of the tire tube is illustrated in Figs. 3 to 6 inclusive. According to the steps there illustrated, the sealing composition is formed as an elongated flexible rod or noodle 4ª (Fig. 3) which is completely covered by a thin coat or tube of vulcanizable rubber 6, the latter being preferably of the same compounded stock from which the tube wall 1 is formed. The elements thus formed are arranged in side-by-side relation as shown in Fig. 4 and pressed together slightly, whereupon they become temporarily united at their sides so as to be readily handled as a complete strip. Two such composite strips 7 and 8, one of which preferably contains one more rod or noodle than the other, are then cut to appropriate lengths and superimposed upon each other, and then placed between two strips 9 and 10 of regular tube stock (Fig. 5), which latter are of such width as to have their opposite edges overlapped to form the complete tube 1 (see dotted lines in Fig. 5). The tube thus formed is then vulcanized in any ordinary or preferred manner, whereupon the vulcanizable rubber sheets 9 and 10, together with the covering tubes 6 of the several cell units, flow and become united into a homogeneous whole, the sealing composition (which remains plastic) being permanently confined locally in the various cells. The internal pressure within the tube during the vulcanizing operation naturally tends to flatten the several cell units somewhat as shown in Fig. 2, and by reason of the fact that they are so flattened, there will be no point in the tread of the tube where a puncture can occur without intersecting at least one of the cells.

One method of producing the composite sealing rods or noodles of Fig. 3 is illustrated in Fig. 6, wherein two standard extruding machines 14 and 15 are arranged with their discharge ends adjacent each other and with their axes substantially perpendicular to each other. The extruding machine 14 has a discharge die 16 with a small central opening through which the plastic sealing composition is forced into a central longitudinal bore 17 of a mandrel 18. The outer end of this mandrel 18 is tapered, as shown at 19, and extends through the extruding die 20 of the second extruding machine 15. The extruding die 20 has a central opening which is slightly larger in diameter than the end of the mandrel 19, whereby to provide between the two an annular space through which the vulcanizable tube stock will be expelled from the extruding machine 15. As will be understood, the machines 14 and 15 are provided with the usual form of screw feeding devices and are operated simultaneously, so that the completely covered rod or noodle 4ª is delivered from the extruding die 20 in condition for immediate use in the manner above described.

An alternative method for producing the composite sealing strip is illustrated in Figs. 7 to 10 inclusive, wherein an extruding machine 22 is provided with a die 23 having a plurality of spaced die openings through which a series of flexible rods or noodles 4ᵇ of the plastic sealing composition may be simultaneously extruded. These sealing rod elements 4ᵇ come out of the extruding die 23 in spaced parallel relation and are received upon the upper surface of a relatively thin layer or sheet 24 of vulcanizable rubber, which is fed or drawn from a supply roll 25 to the upper stretch 26 of an endless conveyor belt. This conveyor belt runs over pulleys 27 and 28, one of which is appropriately driven, as by means of a pulley 29, so as to travel in a direction away from the extruding machine 22 and at substantially the same linear speed as that at which the sealing rod elements 4ᵇ are delivered to it. A second layer or sheet of vulcanizable rubber 30 is simultaneously fed from a supply roll 31 under a guide roll 32 and laid upon the sealing elements 4ᵇ as they travel under said guide roll, so that the sealing elements become arranged between the two strips of vulcanizable rubber in the manner shown in Fig. 9.

The conveyor belt 26 is then caused to carry the rubber strips 24 and 30, with the sealing elements 4ᵇ between them, through a pair of pressing or stitching rolls 33 and 34, the upper one of which has its periphery corrugated or grooved to provide annular stitching portions 35, which are adapted to force the upper rubber sheet 30 down into engagement with the lower sheet 24 between the sealing elements 4ᵇ, as shown in Fig. 10. The vulcanizable rubber strips being of a tacky nature readily adhere by reason of this stitching pressure and thus form a composite strip 36 which can be cut into suitable lengths and handled as a unit in the subsequent assembling operations.

Another method of producing the rubber covered noodles is illustrated in Fig. 12. According to this method, the plastic sealing composition is extruded in the form of a flexible rod 4ᵇ and delivered to a narrow conveyor belt 40 by which it is carried away from the extruding die. As it travels on the belt 40, the rod is cut to the appropriate length and a corresponding length of gum strip 41 is laid upon a table 42 beside the conveyor. By means of a board 43, the rod 4ᵇ of sealing composition is then rolled from the conveyor belt and onto the gum strip, and as the rolling movement continues the gum strip adheres to the surface of the rod and becomes wrapped around the same, so that the sealing composition becomes entirely covered with vulcanizable rubber, forming an individual noodle unit substantially like that illustrated in Fig. 3. The rubber covered noodles, as they are successively formed, are then placed side by side in trays 44, as shown in Fig. 13 preparatory to their assembly into a component sealing strip.

Each of the trays 44 comprises a relatively flat base plate 45, of wood or other suitable material, provided on its upper surface with spaced parallel strips 46, the inner edges of which are beveled as indicated at 47. The thickness of the strips 46 is slightly less than the diameter of the rubber covered noodles so that the noodles when first placed within the tray will extend above the upper surfaces of the strips 46 (see the uppermost tray shown in Fig. 13). The strips 46 are spaced apart a definite distance in order to accommodate a predetermined number of the rubber covered noodles, and when the successive trays are filled, they are stacked one upon the other as illustrated in Fig. 13, with the result that the lower surface of one base plate 45 bears upon and compresses the noodles which are contained in the tray immediately below it. This action compresses the noodles, transforming their cross-sectional shapes from round to square and causing their meeting sides to adhere together, so that all of the noodles in each tray are merged into a unitary strip.

The trays are subsequently conveyed to an unloading station, where the noodle strips are removed from them and applied to the inner surfaces of tube stock in substantially the same way as previously explained. The tube is then ready for vulcanization and in this operation the gum coverings of the various noodles become a homogeneous part of the tube wall and define the circumferential cells within which the plastic sealing composition is confined. The trays 44 are of course not limited to use in connection with rubber covered noodles as formed in Fig. 12, but they may also be used for assembling and compressing the noodles when formed in other ways, as for example in Fig. 6.

In Fig. 14, an inner tube 1a is shown with only a single row of sealing cells 3, which have been formed as described with reference to Figs. 12 and 13. For most practical purposes, one row of cells is deemed sufficient, since the rubber walls which separate the adjacent cells are quite thin and leave little room for a puncturing object to go through the tread wall of the tube without entering at least one of the sealing cells. Of course for the larger size or heavy duty tubes, it may be desirable to employ two rows of cells, as shown in Fig. 2.

The sealing elements or strips may be applied to either drum-bilt or pole-built inner tubes, or to tubes built in other fashion, and the arrangement is such as to be conducive to economical production. Obviously the invention is susceptible of numerous modifications in the details of construction and in the steps of the method, and the right is therefore reserved to make such changes as fall within the scope of the appended claims without departing from the spirit of the invention.

Having thus described my invention, what I claim is:

1. The method of producing tire tubes, which consists in forming a puncture-proof tread strip of vulcanizable rubber with a multiplicity of longitudinal cells filled with a soft or plastic sealing composition, applying said tread strip to the inner surface of a tube blank, and vulcanizing the tube blank in the desired annular shape.

2. Steps in the method of producing puncture-proof tire tubes, which consist in extruding relatively thin sections of soft or plastic non-vulcanizable rubber composition, covering said sections with vulcanizable rubber, and applying a plurality of such covered sections to the inner surface of a tire tube and in side-by-side relation to each other.

3. Steps in the method of producing puncture-proof tire tubes, which consist in extruding relatively thin sections of soft or plastic non-vulcanizable rubber composition, covering said sections with vulcanizable rubber, assembling a plurality of such covered sections in joined side-by-side relation to produce a composite sealing strip, and securing the so-formed sealing strip to the inner surface of the tread wall of a tire tube.

4. Steps in the method of producing puncture-proof tire tubes, which consist in extruding relatively thin sections of soft or plastic non-vulcanizable rubber composition, covering said sections with vulcanizable rubber, assembling a plurality of such covered sections in joined side-by-side relation to produce a composite sealing strip, and securing the so-formed sealing strip to the inner surface of the tread wall of a tire tube and vulcanizing the parts into a homogeneous whole.

5. The method of producing tire tubes, which consists in forming a plurality of relatively thin elongated sections of soft or plastic non-vulcanizable rubber composition, covering said sections in side-by-side relation with vulcanizable rubber, and applying the composite strip so formed to the inner surface of the tread portion of a rubber tube.

6. The method of producing tire tubes, which consists in forming a plurality of relatively thin elongated sections of soft or plastic non-vulcanizable rubber composition, covering said sections in side-by-side relation with vulcanizable rubber, and applying the composite strip so formed to the inner surface of the tread portion of a rubber tube and uniting them by vulcanization.

7. The method of producing tire tubes, which consists in extruding soft or plastic non-vulcanizable rubber composition in relatively thin elongated sections, arranging a plurality of such sections in parallel relation in a single plane, covering them with vulcanizable sheet rubber in such way that the non-vulcanizable sections will each be completely surrounded by the sheet rubber, and securing the so-formed composite strip to the inner surface of the tread portion of a tire tube.

8. Steps in the method of producing tire tubes, which consist in forming a plurality of relatively thin elongated sections of soft or plastic non-vulcanizable rubber composition, laying said sections in spaced parallel relation between two layers of vulcanizable rubber, and passing said layers and sections between corrugated pressure rolls whereby to unite the two layers of vulcanizable rubber on lines between the respective non-vulcanizable sections.

9. Steps in the method of producing tire tubes, which consist in simultaneously extruding a plurality of relatively thin elongated sections of soft or plastic non-vulcanizable rubber composition, and embedding said sections in lateral relation in vulcanizable rubber to form a puncture-proof tube tread strip.

10. Steps in the method of producing tire tubes, which consist in simultaneously extruding a plurality of relatively thin elongated sections of soft or plastic non-vulcanizable rubber composition, laying said sections in spaced parallel relation between two sheets of vulcanizable rubber, and subjecting one of the sheets to the action of a corrugated member whereby to unite it with the other sheet on lines between the non-vulcanizable sections.

11. Steps in the method of producing tire tubes, which consist in simultaneously extruding a plurality of relatively thin elongated sections of soft or plastic non-vulcanizable rubber composition, delivering them by a longitudinal movement to positions between layers of vulcanizable rubber, and passing said elements jointly between pressure rolls to stitch the two layers of vulcanizable rubber together between the non-vulcanizable sections.

12. The method of producing a puncture-proof tube, which consists in providing a tube blank of vulcanizable rubber, providing an inside tread strip of vulcanizable rubber containing a plurality of cells containing a non-vulcanizable rubber sealing composition, and then vulcanizing the tread strip and the tube blank together into a homogeneous whole.

13. Steps in the method of producing a tire tube, which consist in delivering to a conveyor a flexible rod of plastic non-vulcanizable rubber, cutting the rod into appropriate lengths as it travels along the conveyor, providing a strip of vulcanizable rubber of length corresponding to that of a cut section of the rod on a table arranged laterally of the belt, and rolling the rod laterally onto and over the strip until completely enwrapped therein.

JESSE R. CROSSAN.